United States Patent [19]

Rosenzweig

[11] Patent Number: 5,074,391

[45] Date of Patent: Dec. 24, 1991

[54] CRUSHABLE DEVICE FOR ABSORBING IMPACT ENERGY

[75] Inventor: Nachum Rosenzweig, Kfar Vradim, Israel

[73] Assignee: Sintram Ltd., Tefen, Israel

[21] Appl. No.: 432,534

[22] Filed: Nov. 7, 1989

Related U.S. Application Data

[63] Continuation-in-part of Ser. No. 336,136, Apr. 11, 1989, abandoned.

[51] Int. Cl.$^5$ .................................. F16F 7/12
[52] U.S. Cl. ........................... 188/374; 188/377
[58] Field of Search ............... 188/371, 372, 373, 374, 188/375, 376, 377

[56] References Cited

U.S. PATENT DOCUMENTS

| | | | |
|---|---|---|---|
| 2,997,325 | 8/1961 | Peterson | 188/374 X |
| 3,236,333 | 2/1966 | Mitchell | 188/374 |
| 3,380,557 | 4/1968 | Peterson | 188/374 |
| 3,381,778 | 5/1968 | von Tiesenhausen | 188/375 |
| 3,428,150 | 2/1969 | Muspratt | 188/375 |
| 3,532,380 | 10/1970 | Studer et al. | 188/374 X |
| 3,865,418 | 2/1975 | Saxl | 188/374 X |
| 4,523,730 | 6/1985 | Martin . | |

FOREIGN PATENT DOCUMENTS

| | | | |
|---|---|---|---|
| 1506157 | 4/1978 | United Kingdom | 188/374 |
| 2048430 | 4/1980 | United Kingdom | 188/374 |

Primary Examiner—Robert J. Oberleitner
Assistant Examiner—Alfred Muratori
Attorney, Agent, or Firm—Amster, Rothstein & Ebenstein

[57] ABSTRACT

Impact energy is absorbed by empolyment of a discrete elongate body of a ductile material arranged along a longitudinal axis to receive an axial impact force at a first end thereof along the longitudinal axis and apparatus arranged adjacent a second end of the body of ductile material for extrusion thereof, the body of ductile material being operative to transmit the axial impact force axially therethrough from the first end to the second end.

9 Claims, 3 Drawing Sheets

CRUSHABLE DEVICE FOR ABSORBING IMPACT ENERGY

This application is a continuation-in-part of U.S. patent application Ser. No. 336,136 filed Apr. 11, 1989, now abandoned.

FIELD OF THE INVENTION

The present invention relates to a device for absorbing impact energy.

BACKGROUND OF THE INVENTION

In many dynamic systems, there is sometimes created a destructive deceleration which develops within a relatively short distance. While in certain circumstances, a compartment subject to distortion may provide an adequate survival space, nevertheless, the human body cannot withstand deceleration forces, above a certain limit.

The efficiency of an energy absorbing device is given by the ratio:

SEA (specific energy absorbed) = energy absorbed/device weight.

A common unit of specific energy is J/g. (Joules/gram). The desirable features of an energy absorbing device are as follows:
- it should provide a predictable FORCE vs. DEFORMATION trace;
- the rapid loading rate expected in crashes should not change the FORCE vs. DEFORMATION behavior;
- it should operate under both tension and compression;
- the device should be as light and as small as possible;
- the specific energy absorption (SEA) should be high;
- it should be economical to manufacture;
- it should be reliable and maintenance-free for a long period of time;
- it should not be adversely affected by dirt, corrosion or other environmental factors;
- the person involved should be decelerated in the most efficient manner possible, while maintaining the loading environment within the limits of human and/or payload tolerance;
- its stroke should be relatively long as compared to its total length (i.e. a high stroke efficiency).

There are many energy absorbing devices for impact applications, the most common ones utilize deformation of metals and friction to dissipate energy. Some examples are as follows:

| Device | SEA(J/g.) |
| --- | --- |
| axial compression of a steel tube | 25 |
| axial compression of an Al tube | 16 |
| steel strap/wire over die or roller | 4 |
| steel inversion tube | 4 |
| basic elongation of steel | 14 |
| crushing a rigid foam | 20 |
| steel rod pulled through a tube | 2 |
| tube flaring | 3 |
| controlled crushing of a metal tube | 45 |
| controlled crushing of structural honeycomb | 40 |
| controlled axial crushing of a composite tube | |
| with Kevlar(R) reinforcing fiber | 20 |
| with glass reinforcing fiber | 60 |
| with carbon reinforcing fiber | ≦100 |

It should be noted that in the last three cases (controlled axial crushing of a composite tube) the reported SEA values refer to the absorbing material and not to the entire device. Moreover, carbon fibers are relatively expensive. In addition to the above examples, there exist energy absorbing devices based on an elastic element such as springs, compressed gas and fluids. However, their stroke is short, the force increases and they become almost rigid. Their strong recovery and bounce back are undesirable. In some cases (pneumatic/hydraulic shock absorbers) a valve forces fluid out at a predesigned pressure; such devices have SEA in the range 5 to 25 J/g.

In U.S. Pat. No. 4,523,730 (Martin), there is disclosed an energy absorbing seat arrangement, particularly for a helicopter, in which a seat pan is carried by a frame slidably mounted on parallel upwardly extending pillars secured to the helicopter. Normally, downward sliding of the frame on the pillars is prevented either by metal rods extending through drawing dies, or by a deformable metal tube and a mandrel extending through the tube. In the event of a crash, the rods are drawn through the dies or the mandrel through the deformable tube. However, this metal/metal arrangement, like other similar arrangements, suffers from a relatively low SEA, the fact that it is very restricted as to its potential for cross-sectional area reduction (maximum elongation of a ductile stainless steel is only 45-50%), dependence on metal/metal friction to maintain a uniform load is unpredictable, while oxidation may alter the properties of the metal/metal interface. As will be seen, the present invention does not utilize a metal/metal arrangement and thus avoids such problems.

U.S. Pat. No. 3,865,418 describes an energy absorbing device for a vehicle including a cylinder having a stepped inner diameter and in which an annular plastic slug is extruded between the cylinder and a stepped ram. The stroke efficiency is less than one half of the length of the device.

U.S. Pat. No. 2,997,325 to Peterson describes a kinetic energy absorber in which a piston forces an extrudable body through a nozzle. U.S. Pat. No. 3,380,557 describes a variable kinetic energy absorber in which a piston serially forces a plurality of extrudable bodies, each having an increased resistance to extrusion, through a nozzle. Both of these patents employ a cylinder formed of heavy metal in order to withstand the high pressure produced during extrusion. The proposed structure is relatively heavy and therefore the absorber has a relatively low SEA. The piston stroke is limited to the length of the cylinder and thus the stroke efficiency of the absorber is limited to less than one half of the overall absorber length. Furthermore, during stroking, the friction force between the extrudable plastic material and the cylinder wall decreases producing a consequent reduction in the stopping force of the absorber, as the stroke progresses.

U.S. Pat. No. 3,532,380 describes an energy absorbing device for a restraint belt. GB Patent Application 1,506,157 describes an energy absorbing device employing a piston and extrudable material which is similar to that described in U.S. Pat. No. 3,865,418 but employs a smooth cylinder. UK. Published Patent Application 2,048,430 describes a device absorbing energy by extrusion.

SUMMARY OF THE INVENTION

It is an object of the present invention to provide an energy absorption device having the desirable properties listed above. Another object of the present invention is to provide such a device having specific energy absorption generally higher than the SEA's of prior art energy absorbing devices.

The present invention employs the realization that a solid body of ductile material is capable of transmitting axial forces therethrough, generally without dissipation of the force in non-axial directions.

Further objects of the invention will be apparent from the description which follows.

The present invention accordingly provides an energy absorption device which comprises an elongate body of a ductile material arranged along a longitudinal axis arranged to receive an axial impact force at a first end thereof along the longitudinal axis, apparatus arranged adjacent a second end of the body of ductile material for extrusion thereof, the body of ductile material being operative to transmit the axial impact force axially therethrough from the first end to the second end.

In accordance with the present invention the pistons and cooperating cylinders required by the prior art, which add significant weight and greatly limit the stroke efficiency may be eliminated. A high SEA is provided.

In accordance with one preferred embodiment of the invention a relatively thin walled sleeve may be provided to prevent buckling of the elongate body. Preferably, the sleeve is frangible during extrusion at the second end, so as to enable the available stroke length to be nearly equal to the overall length of the energy absorbing device.

Preferably, the body of ductile material comprises at least one discrete nonmetal ductile solid element which undergoes reduction of its cross-sectional area and in particular undergoes combined deformation of shear, compression and elongation. The solid element is preferably formed of a polymer, such as Nylon-6, Nylon-6,6, Nylon-6,12, Polypropylene, Polycarbonate, Polysulfone, Polyetheretherketone, or Stilan, manufactured by Raychem Corporation of California, of USA. The work of deformation, plus friction between the nonmetal ductile solid and the solid surface of whatever is used to effect reduction of the cross-sectional area, absorb the kinetic energy of a decelerating object. In accordance with the invention, the cross-sectional area as aforesaid is reduced by at least 25%, preferably at least 40% and most preferably at least 50%.

In a particular embodiment, the invention provides a device for absorbing impact energy, which comprises in operative combination: at least one discrete nonmetal ductile elongate solid body which receives an impact force and retains its coherence when undergoing reduction of its cross-sectional area by not less than 25%; a rigid element defining a restricted space having a smaller cross-sectional area than the at least one discrete nonmetal ductile solid shape, whereby when the body is subjected to a force which induces it to pass through the restricted space, the smaller cross-sectional area is such that the shape by passage through the restricted space experiences a reduction in cross-sectional area of not less than 25%; and a transmission, which may include a piston, for transmitting impact energy incident on the device to the at least one discrete nonmetal ductile solid shape, whereby the latter is subjected to a force which induces it to at least in part pass through the restricted space.

In another embodiment, the invention provides a method for absorbing impact energy, which comprises the step of applying an impact force along a longitudinal axis to a first end of an elongate body of a ductile material arranged along the longitudinal axis, thereby causing it to be extruded by apparatus arranged adjacent a second end of the body of ductile material, wherein the elongate body of ductile material is operative to transmit the axial impact force axially therethrough from the first end to the second end.

In accordance with a preferred embodiment of the invention, the body of ductile material is subjected to a force, which may include e.g. compressive and/or tensional forces, which reduces its cross-sectional area by not less than 25%, while said ductile solid maintains its coherence. Said force is preferably one which induces said discrete nonmetal ductile solid shape to at least in part pass through a restricted space, and the latter may be defined by a rigid part and would have a smaller cross-sectional area than the discrete nonmetal ductile solid shape, whereby when the shape is subjected to a force which induces it to pass at least in part through the restricted space, the smaller cross-sectional area is such that the shape by passage through the restricted space experiences a reduction in cross-sectional area of not less than 25%.

In accordance with an alternative embodiment of the present invention, there is provided a device for absorbing energy during an axial initial impact and during an elastic rebound in a direction opposite that of the axial initial impact, comprising an elongate body arranged a longitudinal axis which comprises elongate fibers along its axis and which is operative to receive the axial initial impact force at a first end thereof along the longitudinal axis. The device also comprises apparatus arranged adjacent a second end of the body for deformation thereof. The apparatus includes die apparatus for producing deformation of the body and ringed apparatus fixed to the die apparatus and spaced therefrom thereof, for surrounding the body adjacent the die means and for breaking the elongate fibers into elongate stringlike elements which maintain high tensile strength during the elastic rebound.

DETAILED DESCRIPTION OF THE INVENTION

Figure 1:
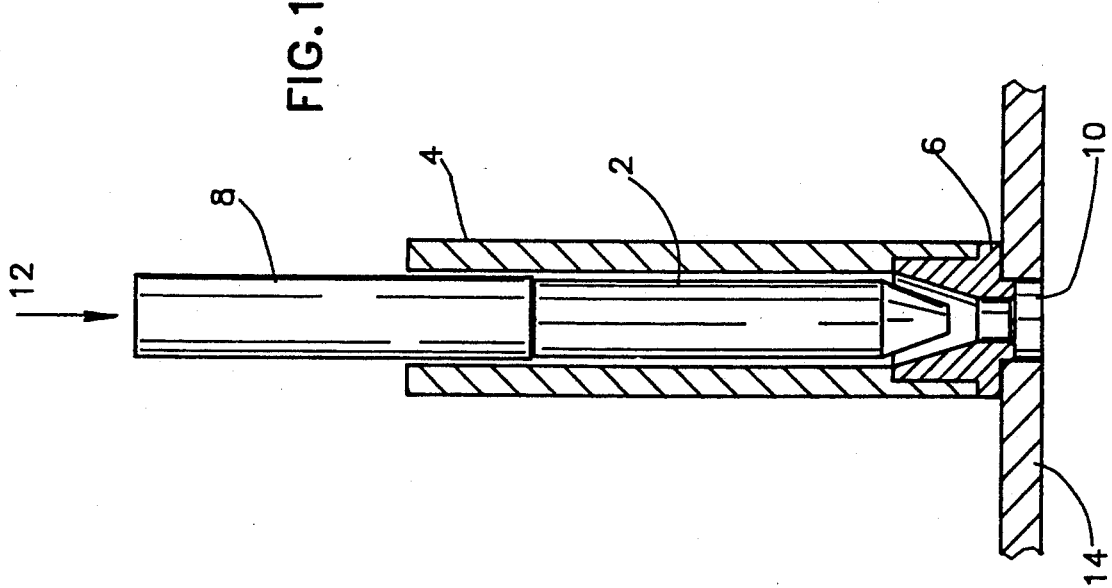
FIG. 1 illustrates in section an embodiment of the present invention.

According to a particular embodiment of the invention, the discrete nonmetal ductile solid body is in the form of a billet which has a conically shaped head, the axis of symmetry of this head being directed towards the hole of a die, so that when impact occurs, the billet begins to be extruded therethrough. The SEA of the energy absorbing device is preferably at least 30, more preferably at least 50, yet more preferably at least 60 and most preferably at least 80 J/g. While for purposes of illustration reference will be made herein to billets, it will be appreciated by persons skilled in the art that other suitable shapes may be made to undergo the required reduction in cross-sectional area, normal to the stroke direction.

It has been found in accordance with the invention, that the higher the crosssectional ratio between the die's inlet and its outlet (i.e. the draw ratio=DR), that a material can tolerate without breaking, the higher is the pressure required to pass it through the die, and the higher is the work done on the extruded material. Each material has a different maximum useful DR (although in general this will usually be less than 9), and the pressure required to force it through a die may also vary. However, the material of the billet should not break in the die, it should maintain its continuity until emerging therefrom. Otherwise, rupture of the material in the die may cause sharp changes in the magnitude and direction of the force and the deceleration, and the energy absorbing process is destabilized. Materials which may not be used for the device of the invention may be illustrated by two extremes, namely, low viscosity fluids in which the pressure required to pass them through a given die and the work done are low, and materials which are so hard that it is practically impossible to pass them through a die.

The work done is the sum of two components: the friction between the billet and the die, and the work required to reshape the billet. The friction component should be limited in magnitude, in those cases where it is difficult to control the normal force causing the friction and/or in those cases where heat evolved at the die-billet interface cannot be dissipated efficiently. The work done to reshape the billet is desirable, since it is three-dimensional work, the heat generated being absorbed throughout the billet's volume.

The SEA of the billet is directly proportional to the extrusion pressure and inversely proportional to the billet's density, as may be seen from the equation:

$$SEA = 0.0981 p/d \qquad (8)$$

where d is the density of the billet material expressed in g./cm$^3$ units and p is the extrusion pressure expressed in kg./cm$^2$ units.

It was surprisingly discovered in accordance with the present invention that if the billet is made of nonmetal such as polymeric material, then its SEA is usually higher, compared with other materials such as mechanically stronger metals. Moreover, polymeric materials can usually be extruded through a conventional die, without external heating, and they generally develop considerable stress without breaking in the die, at high stroke speeds, with high cross-sectional reductions rates. In fact, their generally lower density compared with metals magnified their SEA advantage. Particularly useful in accordance with the invention are billets made from ductile Polyaryletherketone (Stilan), polyamides and polyolefins. Exemplary polyolefins are polyethylene and polypropylene, preferably of high molecular weight; among polyethylenes, most preferred is that of ultra high molecular weight. In general for a given DR, the higher the molecular weight of the polyethylene, the higher the SEA. Presently preferred is polyethylene having a molecular weight of about $3.3 \times 10^6$. However, it was surprising to find that above this molecular weight, the SEA fell, at least for DR's above 4, at testing velocities of 0.025 meters/sec. and above, due to either extrudate cracking, or breakage in the die.

In connection with the present invention, it has been observed that on room temperature extrusion of some polymers through a die, even at a high feed rate (such as e.g. 11 meters/sec.), the extrudate elongation exceeded the reported values of the ultimate elongation at room temperature of a slow speed tensile test. Examples are given in the following Table:

| Polymer | Reported Elongation | Elongation Found |
| --- | --- | --- |
| Nylon 6 and 6/6 | 300% | 400% |
| Polyacetal | 100% | 186% |
| Polycarbonate | 110% | 186% |
| Rigid PVC | 80% | 186% |
| Stilan | 100-150% | 186% |

These observations are surprising, since polymers are rate sensitive and would be expected to fail due to brittleness at a higher rate tensile test. Since the energy absorbed by a material is a product of deformation force and strain displacement, this demonstrated extra ductility is very useful in providing an increased amount of energy that a polymer can absorb and thus the foregoing polymeric materials may be advantageously employed in accordance with the present invention.

The SEA values that were calculated from experimental data, for some polymeric systems, were found to be exceptionally high, when compared with values known in the art, as have been set out above. Examples are given in the following Table. It will be appreciated that the higher the DR that a material can be extruded through without breaking, the higher is its SEA.

| Polymer | DR | SEA (J/g.) |
| --- | --- | --- |
| Polyethylene* | 6.1 | 244 |
| Polypropylene | 6.1 | 352 |
| Nylon 6 | 6.1 | 367 |
| Nylon 6/6 | 5 | 346 |
| Nylon 6/6 | 6.1 | 440 |

*MW = $3.3 \times 10^6$

The overall SEA of an energy absorbing device is equal to or lower than that of the material per se. Thus, the upper limit on the efficiency of an EA device is determined by the intrinsic energy absorption capability of the particular material. The concept of the present invention enables the design and construction of efficient and lightweight energy absorption devices.

It has also been discovered in accordance with the present invention that an additive such as carbon black, when incorporated into the polymeric material increases its SEA. However, at higher concentrations, it lowers the potential maximum DR due to embrittlement of the extrudate. Carbon black has the advantages of providing ultraviolet protection, and dissipating static electricity, by making the polymer electrically conductive. The electrical conductivity may also be useful for electrical heating of the billet to control its EA performance.

The present invention may be applied to load limiting devices in general aviation seats, as part of landing gear in helicopters and other craft, bumper systems for ground transportation vehicles, safety fences on highways, at the bottom of an elevator pier to counteract the effects of free falling crashes, for payload parachuting, and for any other system where it is desirable to control the effects of deceleration. Thus, the transmission means referred to above may be at least part of a structural component of any of these items.

Generally, the at least one discrete nonmetal ductile solid shape may comprise at least one member selected from polymers. Suitable polymers are, for example, polyolefins (e.g. polypropylene or ultra high molecular weight polyethylene), polyamides, polyacetal, poly(-haloalkenes), polyetheretherketones, polyarylether ketones (Stilan), polysulfones, and polycarbonates. Other ingredients which may be present are e.g. carbon black, metals, metal salts, other metal compounds, silica, antioxidants, stabilizers, plasticizers, lubricants, crosslinking agents, powder fillers, fibers, flakes, microbeads and microballoons.

The at least one discrete nonmetal ductile solid shape is typically placed in a sleeve which supports the solid shape against buckling. A piston is used to force the ductile solid towards the die and the sleeve is operative to guide the piston's motion. The sleeve is typically elongate and is strong enough to maintain mechanical integrity under impact (i.e. the elongate sleeve does not buckle or crack). To this end, it is typically manufactured from strong but lightweight materials.

Alternatively, the sleeve can be a crushable sleeve which moves with the ductile solid as it is being pushed towards a crushing location on a die. The portion of the crushable sleeve which is above the die supports the portion of the ductile solid which is above the die; however, as the ductile solid-crushable sleeve combination reaches the die, the ductile solid is extruded through the hole of the die and the crushable sleeve fragments and opens flower-like around the base of the die. Thus, the crushable sleeve supports the ductile solid and additionally absorbs some impact energy.

The invention will now be illustrated by the following non-limitative Examples.

EXAMPLE I

A billet 80 mm. in length, diameter 10.26 mm., and having a 20° conical tip, was machine from commercially available polypropylene rod (d=0.92 g/cm$^3$, melting range=165° to 170° C.). The billet (2, FIG. 1) was placed in a steel elongate sleeve (4) of inner diameter 11 mm. A conical die (6) having a 20° cone angle, 11 mm. inlet diameter and a 4.45 mm. diameter, 10 mm. long outlet, was pressure fitted to the end of the elongate sleeve. A matching steel piston (8) was inserted into the other end of the elongate sleeve, so that the billet was between the piston and the die. All parts were lubricated with an hydraulic oil. The assembly was placed in an hydraulic press (not illustrated except for the special bore (10) in the base (14) of the press, which allows free extrusion). When activated, the hydraulic ram pushed the piston in the direction of the arrow (12) into the elongate sleeve, at a rate of 0.025 m/sec., extruding the polypropylene billet through the die. The extrusion force, recorded at a steady state, was 30.8±2.4 kN. Prior to the experiment, the temperature of the room and the billet was 13° C. The SEA of this billet was determined to be 352 J/g. The extrudate had a fibrillated, rough surface, some 45° off axis scars, but it was nevertheless continuous and strong.

EXAMPLE II

As with Example I, the apparatus illustrated in FIG. 1 was used. A billet 80 mm. in length, diameter 8.2 mm., and having a 20° conical tip, was machined from commercially available polyethylene molded rod (American-Hoechst Hostalen GUR-412, estimated average MW $3.3 \times 10^6$). The billet was placed in a steel elongate sleeve of inner diameter 9 mm. A conical die having a 20° cone angle, 9 mm. inlet diameter and a 4.45 mm. diameter, 10 mm. long outlet, was pressure fitted to the end of the sleeve. A matching steel piston was inserted into the other end of the elongate sleeve, so that the billet was between the piston and the die. All parts were lubricated with an hydraulic oil. The assembly was placed in an hydraulic press having a special bore to allow free extrusion. When activated, the hydraulic ram pushed the piston into the sleeve, at a rate of 0.025 m/sec., extruding the polyethylene billet through the die. The extrusion pressure, recorded at a steady state, was 1585 ±0 bars. Prior to the experiment, the temperature of the room and the billet was 10° C. The SEA of this billet was determined to be 166 J/g. Extrusion proceeded evenly; the extrudate surface was smooth, without any cracks or pinholes. The DR was about 4.1.

EXAMPLE III

As with Example I, the apparatus illustrated in FIG. 1 was used. A billet 80 mm. in length, diameter 8.2 mm, and having a 20° conical tip, was machined from commercially available polyethylene molded rod (American-Hoechst Hostalen GUR-415, estimated average MW $5 \times 10^6$). The billet was placed in an elongate steel sleeve of inner diameter 9 mm. A conical die having a 20° cone angle, 9 mm. inlet diameter and a 4.45 mm. diameter, 10 mm. long outlet, was pressure fitted to the end of the elongate sleeve. A matching steel piston was inserted into the other end of the elongate sleeve, so that the billet was between the piston and the die. All parts were lubricated with an hydraulic oil. The assembly was placed in an hydraulic press having a special bore to allow free extrusion. When activated, the hydraulic ram pushed the piston into the sleeve, at a rate of 0.025 m/sec., extruding the polyethylene billet through the die. The extrusion pressure, recorded at a steady state, was 1640 ±200 bars. Prior to the experiment, the temperature of the room and the billet was 10° C. The SEA of this billet was determined to be 173 J/g. Although the extrudate didn't break, deep ductile cracks turning to a continuous helical crack, covered its surface. Extrusion pressure varied about 25%. The DR was 4.1.

It will be appreciated that friction forces between the billet and the elongate sleeve vary as the billet moves toward and through the die.

EXAMPLE IV

A billet (22, FIG. 2) 150 mm. in length, diameter 10. mm., and having a 20° conical tip, was machined from commercially available polyethylene molded rod (American-Hoechst Hostalen GUR-415, estimated average MW $3.3 \times 10^6$) and placed in a steel elongate sleeve (24) of inner diameter 11 mm. A conical die (26) having a 20° cone angle, 11 mm. inlet diameter and a 6.5 mm. diameter, 10 mm. long outlet, was pressure fitted to the end of the elongate sleeve. A matching steel piston (28) was inserted into the other end of the elongate sleeve, so that the billet was between the piston and the die. All parts were lubricated with an hydraulic oil. The assembly was placed vertically (piston pointing upward), via stand (32), with central space (42) to allow a free exit for the extrudate, on a 4 cm. thick steel base plate (30), which was leveled on a concrete foundation (34). A 34 cm. long, 12.2 cm. diameter steel rod (36), weighing 31 kg. was lifted to a height of 1.75 meters by means of a nylon rope attached at ring (44) and a light pulley (not shown); friction force in free falling was 1 kg. The weight hung within a vertical plastic pipe (38) (14.2 cm inside diameter), the weight having 8 longitudinal plastic fins (40) to center it in the pipe, with an average clearance between the finned weight and the pipe's inner surface of 2 mm. While falling, the weight did not make contact with the inner surface of the pipe. The rope was released, and the weight fell, impacting the piston, pushing it 8.2 cm. into the sleeve, until it came to rest at the top of the piston, supported by the inner wall of the pipe. The weight came to rest quietly and the extrudate surface was smooth and uncracked. The kinetic energy of the impacting weight was 515 J. Since the piston's stroke was 8.2 cm., the average force was $515/0.082 = 6280N$ or 640 kgf. The SEA was 85 J/g., for a DR of 2.86.

EXAMPLE V

Figure 2:
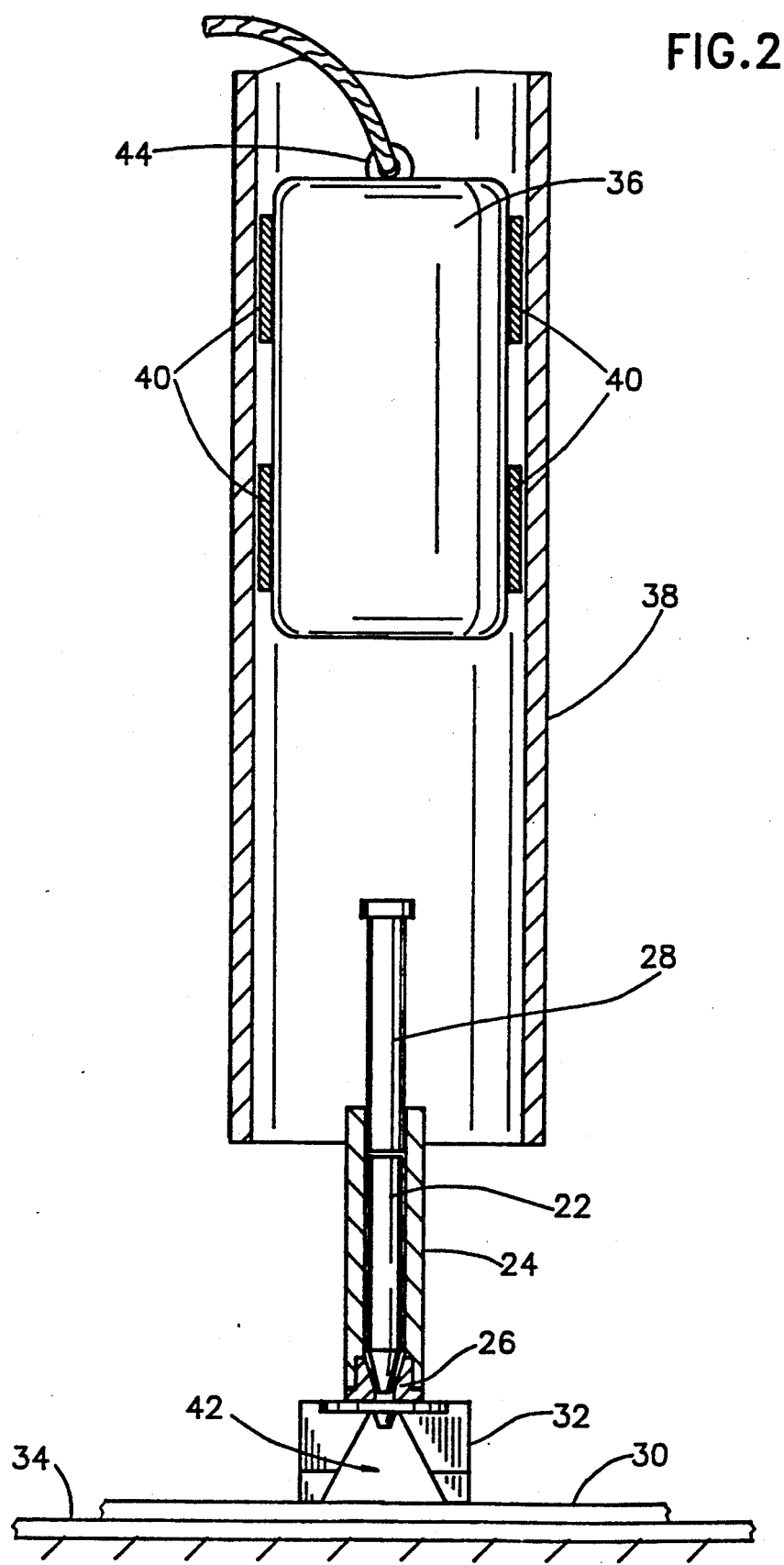
FIG. 2 illustrates in section a falling weight experiment on the embodiment of FIG. 1.

As with Example IV, the apparatus illustrated in FIG. 2 was used. A billet 130 mm. in length, diameter 10 .mm., and having a 20° conical tip, was machined from commercially available nylon-6 rod (Akzo Chemie "Akulon"), and placed in a steel elongate sleeve of inner diameter 11 mm. A conical die having a 20° cone angle, 11 mm. inlet diameter and a 4.9 mm. diameter, 10 mm. long outlet, was pressure fitted to the end of the elongate sleeve. A matching steel piston was inserted into the other end of the elongate sleeve, so that the billet was between the piston and the die. All parts were lubricated with an hydraulic oil. The assembly was placed vertically (piston pointing upward), on a base that had a center bore to allow a free exit for the extrudate. The die assembly was placed on a 4 cm. thick steel base plate which was leveled on a concrete foundation. A 34 cm. long, 12.2 cm. diameter steel rod, weighing 31 kg. was lifted to a height of 7 meters by means of a nylon rope and a light pulley; friction force in free falling: 1 kg.). The weight hung within a vertical plastic pipe (14.2 cm. inside diameter), the weight having 8 longitudinal plastic fins to center it in the pipe, with an average clearance between the finned weight and the pipe's inner surface of 2 mm. While falling, the weight did not make contact with the inner surface of the pipe. The rope was released, and the weight fell, impacting the piston, pushing it into the elongate sleeve, until it came to rest at the top of the piston, supported by the inner wall of the pipe. The weight came to rest quietly after pushing the piston 6.8 cm., and the extrudate surface was smooth and uncracked. The velocity at first contact was estimated at 11.7 meters/sec. The kinetic energy of the impacting weight was about 2060 J. Since the full stroke wasn't utilized, the weight was lifted again to a 3 meter height and dropped on the EA device. At this time the stroke was 2.55 cm. long, when the weight stopped. Since the first impact deformed the billet to attain the elongate sleeve's inner diameter (1.1 cm.), the SEA of the billet during the second stroke could be calculated, neglecting air resistance and EA by the steel/concrete base. Estimated value of SEA was 319 J/g, while the DR was 5. The decelerating average force was about 36 kN. The surface of the extrudate was smooth, with no cracks or pinholes.

EXAMPLE VI

As with Example V, the apparatus illustrated in FIG. 2 was used. However, the thickness of elongate sleeve 4 was reduced to 0.8 mm. A billet 150 mm. in length, diameter 10 mm., and having a 20° conical tip, was machined from commercially available nylon-6 rod (Akzo Chemie "Akulon"), and placed in the thinned steel elongate sleeve of inner diameter of 11 mm. A conical die having a 20° cone angle, 11 mm. inlet diameter and a 6 mm. diameter, 10 mm. long outlet, was pressure fitted to the end of the elongate sleeve. A matching steel piston was inserted into the other end of the sleeve, so that the billet was located between the piston and the die. The experiment was conducted as with Example V. However, the weight was dropped from a height of 5 m. The weight came to rest after pushing the piston 84 mm. The extrudate surface was smooth and uncracked. The velocity at first contact was estimated at 9 m./sec. The steel elongate sleeve did not break or deform, though the decelerating force was 17.5 kN, or 1.79 metric tons. Estimated value of SEA for the billet material was 195 J/g, while the extrusion draw ratio was 3.36.

The ultimate tensile strength of the elongate sleeve's steel is about 60,000 psi, or 4218 kgf/(cm*cm). If the extrusion pressure acts as a hydrostatic pressure (equal in all directions), then the wall thickness required to sustain the related hoop stress is 3.08 mm. The actual wall thickness was 0.8 mm., or 26% of the minimal design thickness.

It will be appreciated that the elongate sleeve functions, in this example, to support the billet and to guide the piston as the two elements moved toward the die. For this example, the elongate sleeve was manufactured of steel, although it could alternatively have been manufactured from materials such as other metals, ceramics, carbon or polymers. The elongate sleeve should be strong but lightweight and able to maintain mechanical integrity in the face of an impact.

EXAMPLE VII

Figure 3:
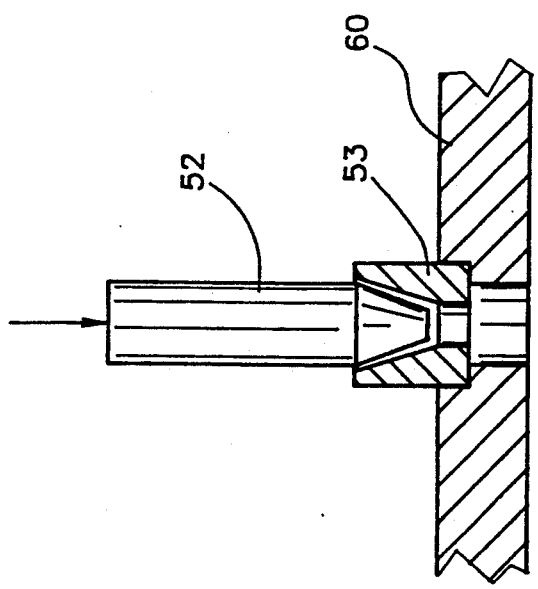
FIG. 3 illustrates in section a further embodiment of the present invention.

A billet 52 (FIG. 3) 100 mm. in length, diameter 19.6 mm. and having a 20° conical tip, was machined from commercially available nylon-6 rod (Akzo Chemie "Akulon"), and placed vertically in a steel die 53 (FIG. 3), so that an 80 mm. long section of the billet protruded above the entrance of the die. The conical die having a 20 degrees cone angle, 20 mm. inlet diameter and a 16 mm. diameter, 8 mm. long outlet, was placed vertically on a base that had a center bore to allow a free exit for the extrudate. The die assembly was placed on a 40 mm. thick steel plate, as illustrated in FIG. 2, with two changes: neither a sleeve nor a piston were present. The procedure of Example V was applied, the weight was dropped from a 4 m. height, impacting the upper part of the billet, pushing it into the die 53 mm. until it came to rest. The billet did not buckle. Extrudate maintained its continuity, with no cracks or pinholes. Extrusion force was 22 kN or 2.2 metric tons. The SEA was 64 J/g., for a die draw ratio of 1.56.

EXAMPLE VIII

A billet 70 (FIG. 4) 170 mm. in length, diameter 19 mm. and having a 20 degrees conical tip, was machined from commercially available nylon-6 rod (Akzo Chemie "Akulon"). The billet was coated with an oil film, and inserted into a fiberglass reinforced polyester crushable sleeve 72, having an inner diameter of 20 mm. and 150 mm. in length.

The composite crushable sleeve was produced by the pultrusion process. The crushable sleeve's front end, and the billet in it were inserted into a die 74 having at its center a conical bore 76 which accommodates the tip 78 of the billet 70. The inlet diameter of the die was 20 mm., the outlet's diameter was 14 mm. and the cone angle was 20 degrees.

The inner surface of the composite crushable sleeve was located at a sleeve-crushing zone 80 of the die. A metallic bushing 82 supported the composite crushable sleeve's outer surface. The upper ends of the billet and the composite crushable sleeve, were at the same height. The die assembly was arranged to allow unimpeded exit of the extrudate.

Figure 4:
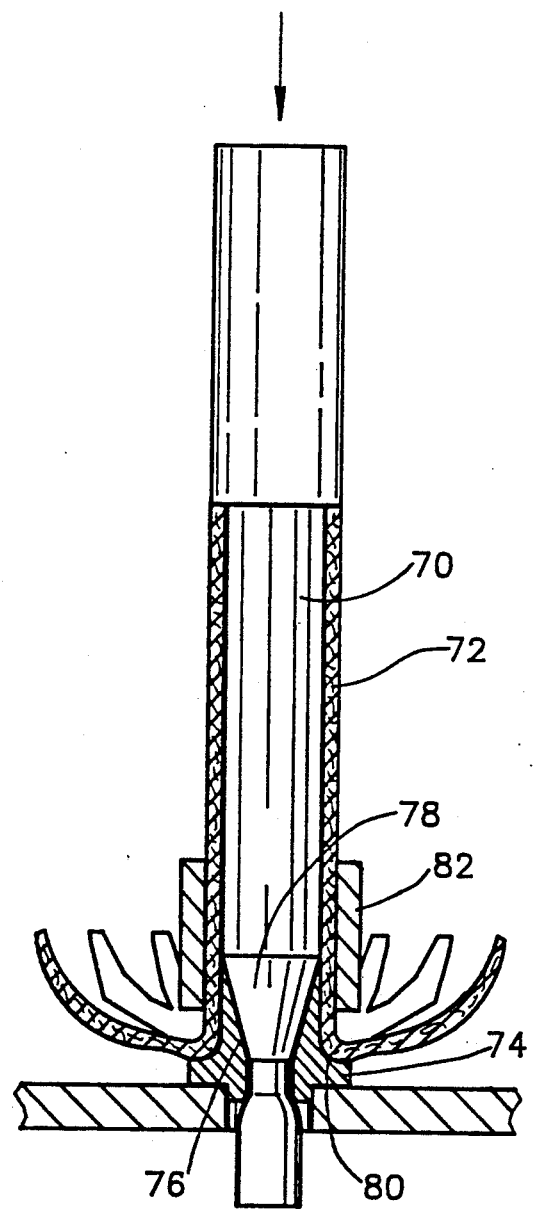
FIG. 4 illustrates in section a preferred embodiment of the present invention, in partially cut away sectional illustration.

A free falling weight was dropped on the billet's/composite's upper ends, from a height of 7 m., according to the procedure that is described in Example IV. The weight came to rest after stroking 35 mm. The extrudate was uncracked and had a smooth surface. 35 mm. of the composite crushable sleeve was crushed and opened flowerlike around the base of die 74. Above the metallic bushing, the composite crushable sleeve did not break. The decelerating force was about 59 kN, or 6 metric tons. The device's SEA (when weights of both billet and crushable sleeve were considered), was 83 J/g. The apparatus of FIG. 4 is a pistonless device where most of the stopping force is transmitted through the billet. The composite crushable sleeve supports the billet against buckling and absorbs also some energy while being crushed.

In accordance with a preferred embodiment of the invention, the composite crushable sleeve is fixed to the billet and moves together therewith. According to one embodiment of the invention, the billet does not completely fill the sleeve. According to an alternative embodiment of the invention, the sleeve may be provided without the billet. In all embodiments, the crushable sleeve is preferably formed of fiber reinforced plastic.

It will be appreciated that the crushable sleeve performs as an elongated sleeve above the metallic bushing 82 with the exception that the crushable sleeve moves with the billet 70 toward the crushing zone 80 of the die 74. Additionally, in this example, there is no piston which pushes the billet towards the die.

It will further be appreciated that the crushable sleeve must be made of a material that will break in an organized and predictable manner such that its fragments do not jam in the die 74. Suitable materials for the crushable sleeve include ceramics, metals, carbon and polymers with the abovementioned restriction that they break in a controllable manner.

Both the crushable sleeve and the elongate sleeve may preferably be comprised of a reinforcing-material/matrix composite. The reinforcing material can be in any shape and form, such as continuous rovings, chopped strands, mats, fabrics, tapes, and whiskers and flakes, and is typically manufactured from glass, carbon, ceramics, boron, kevlar, ultra high molecular weight polyethylene, or other polymeric or metallic fibers. The matrix material is typically a thermosetting or thermoplastic polymer such as epoxy, polyester, polyvinylester, polyphenylenesulfide, polyimide, or polyamideimide.

The composite sleeve is typically manufactured via filament and prepreg winding, pultrusion, casting or molding, or any other method which will produce a composite sleeve.

It will further be appreciated that the device of the present invention maintains its mechanical integrity during an elastic rebound which typically occurs after a crash. In the embodiment of FIG. 4, during impact, the ductile solid is extruded through the hole in the die, after which it swells, and the crushable sleeve is broken into elongate stringlike elements. During an elastic rebound, the ductile solid and the crushable sleeve would ideally move in an upward direction. However, moving them in the upward direction requires work to be expended since the swollen extruded ductile solid and the flowerlike crushed composite sleeve are not easily returned to their previous shapes. Thus, it will be appreciated that the abovementioned embodiment of the present invention absorbs energy during the elastic rebound and reduces its affect.

While the present invention has been particularly described, it will be appreciated by persons skilled in the art that many modifications and variations may be made without departing from the concept of the invention. By way of illustration only, the cone-shaped end of the billet of nonmetal ductile material may be pointed, or the point may be sheared off laterally to form a cone frustum; or the overall billet may have the shape of two coaxial longitudinally opposed cone-frustum-ended billets (of the same or different diameters, and having the same or different cone angles), in which the frustums may be joined by a coaxial "waist"; or the billet may be utilized within a crushable sleeve (made e.g. from a reinforced polyester resin), which has the advantages of improving stroke efficiency, saving weight, doing some work, and eliminating a variable friction force between a moving billet and a stagnant sleeve; or instead of a billet there may be used a sheet which is extruded through rollers or through a slot; or a billet may be pulled by tension (instead of being pushed) through a die and the steel sleeve may be, but need not be, dispensed with. Thus it will be evident that such (and other) modifications and variations may be made without departing from the spirit or scope of the invention as set forth in the appended claims.

I claim:

1. An energy absorption device comprising:
    an elongate body of a ductile material arranged along a longitudinal axis to receive an axial impact force at a first end thereof along the longitudinal axis;
    means arranged adjacent a second end of the body of ductile material for extrusion thereof, the body of ductile material being operative to transmit the axial impact force axially therethrough from the first end to the second end; and
    a relatively thin walled sleeve disposed about said elongate body for preventing buckling thereof;
    wherein said means arranged adjacent a second end of the body include means for locally breaking said sleeve in the vicinity of said second end.

2. An energy absorption device according to claim 1 and wherein said means arranged adjacent said second end of said body include means for locally breaking said sleeve comprising means for retaining said sleeve outside an extrusion area of said means arranged adjacent said second end of said body.

3. An energy absorption device according to claim 1 and wherein said means arranged adjacent said second end comprises ring means surrounding said sleeve for limiting breakage of said sleeve to a location therebelow.

4. A device for absorbing impact energy, which comprises in operative combination:
   at least one discrete nonmetal ductile solid elongate body which retains its coherence when undergoing reduction of its cross-sectional area by not less than 25%;
   rigid means defining a restricted space having a smaller cross-sectional area than said at least one discrete nonmetal ductile solid body, whereby when said body is subjected to a force which induces it to pass through said restricted space, said smaller cross-sectional area is such that said body by passage through said restricted space experiences a reduction in cross-sectional area of not less than 25%; and
   transmission means for transmitting impact energy incident on said device to said at least one discrete nonmetal ductile solid body, whereby the latter is subjected to a force wich induces it to at least in part pass through said restricted space;
   wherein said body is elongate and is contained in an elongate sleeve for preventing buckling thereof; and
   wherein said elongate sleeve comprises a crushable sleeve fixed to said body for crushing at the same time that said body is subjected to said force which induces it to at least in part pass through said restricted space.

5. A device according to claim 4 and wherein said crushable sleeve is formed of a material selected from the group consisting of metals, ceramics, or fiber/polymer composites.

6. A device according to claim 5 and wherein said fiber/polymer composites comprise fibers selected from the group consisting of glass, ceramic, carbon, boron, metallic or polymeric fibers and a polymeric matrix comprised of a thermosetting or thermoplastic resin.

7. A device for absorbing impact energy, which comprises in operative combination:
   a single discrete nonmetal ductile solid elongate body which retains its coherence when undergoing reduction of its cross-sectional area by not less than 25%;
   rigid means defining a restricted space having a smaller cross-sectional area than said single discrete nonmetal ductile solid body, whereby when said body is subjected to a force which induces it to pass through said restricted space, said smaller cross-sectional area is such that said body by passage through said restricted space experiences a reduction in cross-sectional area of not less than 25%; and
   transmission means for transmitting impact energy incident on said device to said single discrete nonmetal ductile solid body, whereby the latter is subjected to a force which induces it to at least in part pass through said restricted space;
   wherein said body is elongate and is contained in an elongate sleeve for preventing buckling thereof;
   wherein said elongate sleeve comprises a crushable sleeve fixed to said body for crushing at the same time that said body is subjected to said force which induces it to at least in part pass through said restricted space; and
   wherein said single discrete nonmetal ductile solid body has a specific energy absorption of at least 50 J/g.

8. A device according to claim 7 wherein said single discrete nonmetal ductile solid body has a specific energy absorption of at least 70 J/g.

9. An energy absorption device comprising:
   a continuous single elongate body of a ductile material arranged along a longitudinal axis to receive an axial impact force at a first end thereof along the longitudinal axis;
   means arranged adjacent a second end of the body of ductile material for extrusion thereof, the body of ductile material being operative to transmit generally the entirety of the axial impact force axially therethrough from the first end to the second end; and
   a relatively thin walled sleeve disposed about said elongate body for preventing buckling thereof which comprises a crushable sleeve which is fixed to said body so that it will be crushed at the same time that said body is subjected to said axial force.

* * * * *